United States Patent [19]

Rickle

[11] Patent Number: 4,530,939

[45] Date of Patent: Jul. 23, 1985

[54] LOW K-FACTOR CLOSED CELL PHENOL-ALDEHYDE FOAM AND PROCESS FOR PREPARATION THEREOF

[75] Inventor: Gregory K. Rickle, Midland, Mich.

[73] Assignee: The Dow Chemical Company, Midland, Mich.

[21] Appl. No.: 558,663

[22] Filed: Dec. 6, 1983

Related U.S. Application Data

[63] Continuation of Ser. No. 347,830, Feb. 11, 1982, abandoned.

[51] Int. Cl.³ ............................................... C08J 9/14
[52] U.S. Cl. .................................. 521/110; 521/112; 521/117; 521/121; 521/181
[58] Field of Search ............... 521/181, 117, 110, 112, 521/121

[56] References Cited

U.S. PATENT DOCUMENTS

| | | | |
|---|---|---|---|
| 2,629,698 | 2/1953 | Sterling | 521/181 |
| 2,933,461 | 4/1960 | Mullen | 521/181 |
| 3,298,973 | 1/1967 | Quarles et al. | 521/181 |
| 4,176,106 | 11/1979 | Reid | 521/181 |
| 4,202,945 | 5/1980 | Leinhardt | 521/181 |
| 4,204,020 | 5/1980 | Beale et al. | 521/181 |
| 4,205,135 | 5/1980 | Beale et al. | 521/181 |
| 4,219,623 | 8/1980 | Sudan et al. | 521/181 |
| 4,247,413 | 1/1981 | Beale et al. | 521/181 |

*Primary Examiner*—Morton Foelak
*Attorney, Agent, or Firm*—Dan R. Howard; Bruce M. Kanuch; Michael L. Winkelman

[57] ABSTRACT

Generally closed cell phenolic foams are prepared which have a K-factor of less than 0.2, preferably from about 0.116 to about 0.170 Btu/hr - °F. - ft - ² per inch of foam thickness when measured at 24° Centigrade. The foams are prepared from a resole resin which has been stripped to a water level of less than 7 percent by weight, preferably from about 3 to about 6 percent by weight based on resin weight. A viscosity adjusting amount of a solvent, such as phenol, and from about 10 to about 20 weight percent, based on resin weight, of a polyglycol are also part of a foam forming formulation. Conventional surfactants, blowing agents and acidic catalysts are used to prepare the foams. The foams so prepared generally have no tendency to autoxidize when placed in an oven heated to a temperature of 250° Centigrade. The foams so prepared also have enhanced resistance to flame penetration.

11 Claims, No Drawings

LOW K-FACTOR CLOSED CELL PHENOL-ALDEHYDE FOAM AND PROCESS FOR PREPARATION THEREOF

CROSS-REFERENCE TO RELATED APPLICATION

This is a continuation of application Ser. No. 347,830, filed Feb. 11, 1982, now abandoned.

BACKGROUND OF THE INVENTION

The present invention relates to phenolic foams prepared from resole resins. More particularly, the present invention relates to generally closed cell phenolic foams which are prepared from resole resins and which have a K-factor of less than about 0.22.

Phenol-aldehyde foams have been prepared for many years by a method which involves the addition of an acid catalyst to a liquid phenol-aldehyde resole resin. Polymerization of the resole resin commences very quickly following the addition of the acid catalyst. Inasmuch as the reaction is highly exothermic, the heat liberated by the reaction rapidly increases the temperature of the reaction mixture. The continuing increase in reaction temperature progressively increases the rate of polymerization. Accordingly, the reaction proceeds to completion very quickly. In fact, once initiated, the reaction is generally considered to be nearly impossible to control. The temperature of the reaction mixture increases sufficiently to cause the formation of enough steam from the water originally present in the resole resin and the water formed during reaction to foam the resin. The accompanying high reaction temperature causes the initially liquid resole resin to cure to a solid infusible state before the foam collapses. The phenol-aldehyde foam thus prepared has an open cell structure. The open cell structure does not provide for optimum properties with regard to thermal conductivity and resistance to moisture absorption. In addition it has been found that open cell phenol-aldehyde foam has a tendency to punk, that is, to continue to glow red hot and to smolder after high heat is applied and then removed. However, in general the open cell foam has excellent fire resistance and generates only a small amount of smoke when subjected to high temperatures.

In addition to the foregoing difficulties, it has been found that most known cellular materials produced from phenolic polymers exhibit an unsatisfactory thermal conductivity initially. Other known cellular materials produced from phenolic polymers exhibit an undesirable increase in thermal conductivity with time.

Accordingly, it is an object of the present invention to provide an improved closed cell phenol-aldehyde foam material substantially free of the disadvantages of prior foams.

Another object is to provide improved closed cell phenol-aldehyde resin foam material which exhibits a high closed cell content without adversely affecting friability, compressive strength and the low flammability characteristics of the material.

SUMMARY OF THE INVENTION

These benefits and other advantages in accordance with the present invention are achieved in an improved generally closed cell, low K-factor foam material, the foam material being a cured reaction product of:

(a) a phenol-aldehyde resole resin which has been stripped to a water content of less than about 7 weight percent based on weight of resin;

(b) a viscosity adjusting amount of a solvent selected from the group consisting of phenol, aniline, resorcinol, cresol and aminophenol;

(c) from about 10 to about 20 weight percent polyglycol, based on weight of resin;

(d) a surfactant;

(e) a blowing agent; and (f) an acidic catalyst.

Also contemplated as within the scope of the present invention is an improved process for preparing a generally closed cell, low K-factor foam material, the foam material resulting from a process wherein a phenol-aldehyde resole resin, a blowing agent and a surfactant are admixed with an acid catalyst to form an admixture which is then poured into a forming means and cured, wherein the improvement comprises:

(a) stripping the resole resin, in the presence of a viscosity-modifying amount of a suitable solvent, to a water content of less than about 7 weight percent, based on resin weight, and to a workable viscosity; and (b) adding from about 10 to about 20 weight percent, based on resin weight, of a polyglycol to the stripped resole resin.

DESCRIPTION OF THE PREFERRED EMBODIMENTS

Any thermosetting phenol-aldehyde resin in a water-insoluble liquid state, may be employed in compositions of the present invention. In general, such resins are prepared by condensation of one molecular equivalent of a monohydric phenol which is unsubstituted in at least one of the two-, four- and six-positions of the benzene nucleus, with between 1 and 2.5, preferably between 1.4 and 1.5, molecular equivalents of an aldehyde and discontinuing the condensation reaction when the product becomes water-insoluble, but remains liquid. Procedures for making such liquid phenol-aldehyde condensation products are well known in the art and need not be given in detail. However, the condensation reaction is generally started under alkaline conditions, e.g., using from 1 to 2 percent by weight of sodium hydroxide, potassium hydroxide, sodium carbonate, or other basic catalysts, and carried out at temperatures of from about 40° to about 70° Centigrade (°C.). The condensation reaction is carried out to a point at which the product is a fairly thin, water-insoluble liquid. The liquid is then acidified by adding a strong aqueous mineral acid such as hydrochloric or sulfuric acid. The reaction is then continued at temperatures of from about 40° to about 70° C. until the mixture becomes fairly viscous and is water-insoluble. The reaction is then preferably stopped short of the solidification point. It is essential that the phenol-aldehyde condensation reaction be carried to a point at which the product thereof is substantially water-insoluble, although said product itself may have from 20 to 35 percent of water dissolved in it. After carrying the phenol-aldehyde condensation reaction out in the presence of an acid to a point at which the product is a water-insoluble liquid, the mixture is neutralized, e.g., with aqueous ammonia, sodium hydroxide, potassium hydroxide, sodium carbonate, potassium carbonate or the like, and washed thoroughly with water. The condensation product usually retains 20 to 35 percent by weight of dissolved water. In most instances, such condensation product of phenol and aldehyde has a viscosity of from about 300 to about 400 centipoise at 25° C., but it may be lower or higher in viscosity.

Upon standing, an aqueous layer separates from the resin and is decanted off. The resin layer is then washed with an equal volume of water. After the wash water is decanted, the resin is vacuum stripped of additional water until the desired water content and/or viscosity is reached. If a low water and low viscosity resin is desired, a viscosity adjusting amount of a solvent may be added before vacuum stripping. If desired, the viscosity adjusting amount of a solvent may be added to the resin after vacuum stripping rather than before vacuum stripping.

Typical of the phenols that are useful in producing suitable resole resins suitable for the purposes of the present invention are those represented by the formula:

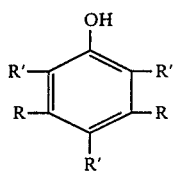

wherein at least two groups represented by R' are hydrogen atoms and the groups represented by R and any remaining group represented by R' are hydrogen atoms or groups which do not impede the condensation of the phenol with an aldehyde (e.g., a substituent such as halogen atom or a hydroxy, alkyl or aryl group). Illustrative of suitable phenols are phenol, cresols (particularly M-cresol), xylenols (particularly 3,5-xylenol), and dihydroxybenzenes (particularly resorcinol).

Typical of the aldehydes that can be used in producing suitable resole resins for purposes of the present invention are formaldehyde (including the oligomers and polymers of formaldehyde such as trioxane), furfural, sugars and cellulose hydrolyzates. Such aldehydes can be employed without dilution or dissolved in suitable solvents including aqueous alcohols (e.g., aqueous methanol, N-propanol, isobutanol or N-butanol).

The solvent employed to adjust the viscosity of the resole resin is suitably selected from the group consisting of phenol, aniline, resorcinol, cresol and aminophenol. Desirably the solvent is selected from the group consisting of phenol and aniline. The solvent is suitably present in an amount sufficient to adjust the viscosity of the resole resin in such a manner that after vacuum stripping the viscosity of the resole resin will be less than about 3,500 centipoise.

The resole resin is stripped via vacuum stripping to a water level, or content, of less than about 7 percent by weight based on weight of the resin. Desirably the resole resin is stripped to a water content of from about 3 to about 6 percent by weight based on weight of resin.

The amount of solvent which is added to the resole resin to adjust the viscosity is suitably from about 8 to about 20 weight percent based on weight of the resin. It is believed that at least a portion of the solvent is capable of reacting with the resole resin during crosslinking reactions which take place during foaming.

The polyglycols which are believed to function as heat sinks for purposes of the present invention are suitably selected from the group consisting of polyethylene glycols and polypropylene glycols.

The acids employed as catalysts are the strong inorganic acids such as sulphuric acid, hydrochloric acid, phosphoric acid, nitric acid; i.e., the strong mineral acids or aqueous solutions of such acids, e.g., a concentrated aqueous solution of hydrochloric acid, or strong organic acids such as benzene sulfonic acid, a toluene sulfonic acid, phenol sulfonic acid, xylene sulfonic acid, beta-naphthalene sulfonic acid and alpha-naphthalene sulfonic acid. Mixtures of any two or more of the acids can also be used. Desirably, the acid employed as a catalyst is benzene sulfonic acid monohydrate.

Oftentimes in order to stabilize pre-gelled foam, a surfactant or surface active agent is employed. Beneficially the surfactant is a nonionic surfactant such as the reaction or condensation product of an alkylene oxide having from two to four carbon atoms in the molecule with a compound such as higher alkyl phenols having from 8 to 12 carbon atoms in the alkyl group, fatty acids having from 12 to 20 carbon atoms and alkyl siloxanes. Among suitable surfactants are (a) the polyoxyethylene ethers of alkyl phenols having the general formula:

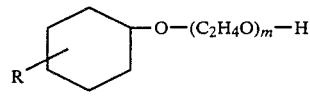

wherein R is an alkyl group having from 8 to 12 carbon atoms and m is an integer of from about 8 to 20; (b) ethoxylated castor oil and ethoxylated hydrogenated castor oil; i.e., the condensation product of said castor oils and from 8 to 24 mols of ethylene oxide per mol of said castor oil; (c) copolymers of ethylene oxide and/or propylene oxide containing from 8 to 20 moieties of each of said alkylene oxides, and alkyl siloxane polyoxyalkylene block copolymers similar to those described in U.S. Pat. No. 2,834,748. In addition, fluorinated surfactants having an alkyl fluorocarbon hydrophobic portion are also suitable.

Beneficially, the surfactant is an alkyl siloxane alkylene oxide block copolymer of the formula:

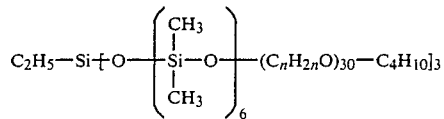

wherein $C_nH_{2n}O$ is a mixed oxyethylene/oxypropylene block of about 17 oxyethylene units and about 13 oxypropylene units; or an alkyl siloxane alkylene oxide copolymer of the formula:

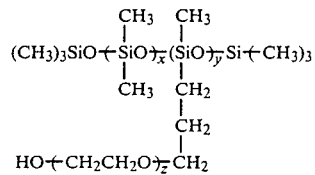

wherein x is an integer equal to 15 or 16, y is an integer equal to 2 or 3 and z is an integer equal to 10 or 11; or an ethoxylated castor oil, i.e., the condensation product of castor oil and about 23 mols of ethylene oxide per mol of said castor oil.

Any blowing agent characteristically employed in similar prior art products can be employed in the process and the product of the process of the present invention. In general, these blowing agents are liquids having an atmospheric pressure boiling point between −50° and 100° C. and preferably between 0° and 50° C. The preferred liquids are hydrocarbons or halohydrocarbons. Examples of suitable blowing agents include, among others, chlorinated and fluorinated hydrocarbons such as trichlorofluoroethane, trichlorofluoromethane, $CCl_2FCClF_2$, $CCl_2FCF_3$, diethyl ether, isopropyl ether, N-pentane, cyclopentane, and 2-methylbutane. The blowing agent is desirably trichlorotrifluoroethane.

Ball, Hurd and Walker have published a comprehensive discussion of K-factor changes as a function of time ("The Thermal Conductivity of Rigid Urethane Foams", J. Cellular Plastics, March/April, 1970, pps. 67–78). F. Norton ("Thermal Conductivity and Life of Polymer Foams", J. Cellular Plastics, January, 1967, pps. 23–37) has shown that diffusion of fluorocarbon gases out of unphased foam and fusion of air into the foam causes an increase in K-factor.

A slow K-drift foam is defined as one that attains a K-factor at 24° C. of 0.15 to 0.17 after 200 to 400 days and then remains below a K-factor of 0.2 for 5 to 10 years. Eventually all fluorocarbon diffuses from the foam to leave a closed cell material which contains only air in the cells.

The K-factor for the closed cell foam containing only air falls in the range of 0.22 to 0.26 British Thermal Units per hour-°Fahrenheit-square foot (hereinafter $Btu/hr\text{-}°F.\text{-}ft^2$) per inch thickness at 24° C. for the 2 to 3 pounds per cubic foot density range. Therefore, if a foam exhibits a K-factor of greater than about 0.22 $Btu/hr\text{-}°F.\text{-}ft^2$ per inch thickness at 24° C. for the 2 to 3 pounds per cubic foot density range after a short period of time (less than 25 days), then substantially all fluorocarbon has diffused from the foam and has been replaced by air. On the other hand, if the K-factor remains below 0.22 $Btu/hr\text{-}°F.\text{-}ft^2$ per inch thickness at 24° C. for the 2 to 3 pounds per cubic foot density range for at least 100 days, then a substantial amount of fluorocarbon gas remains in the closed cells of the foam in spite of infusion of air.

The closed cell foams produced in accordance with the present invention beneficially have a K-factor of less than 0.2 $Btu/hr\text{-}°F.\text{-}ft^2$ per inch thickness at 24° C. for the 2 to 3 pounds per cubic foot density range. Desirably the K-factor for foams produced in accordance with the present invention is from about 0.116 to about 0.170 $Btu/hr\text{-}°F.\text{-}ft^2$ per inch thickness at 24° C. for the 2 to 3 pounds per cubic foot density range.

It is known that typical resole resins contain from about 10 to about 15 percent water based on resin weight prior to foaming. It is also known that additional water is produced in the crosslinking reaction. That water which is not converted to steam by heat of the reaction is believed to separate as a microdroplet phase upon acidification and curing. It has been found that holes form throughout the structure when the microdroplets evaporate. In addition, it is believed that the steam that is generated by heat of the reaction tends to cause large cells to be blown. The combination of large cell size and hole formation is believed to lead to a porous foam structure formed largely of open and interconnecting cells which allow easy diffusion from the structure of blowing agent. Accordingly, the present invention is centered upon making a closed cell foam by reducing initial water content of the phenolic resin.

When phenolic resole resins in general and resins of the present invention in particular are stripped of water to a water content of less than 10 weight percent based on resin weight, viscosity of the resin increases dramatically. As water content of the resin is further reduced to levels of less than about 7 weight percent based on resin weight, viscosity increases become even more pronounced. Typical resins prior to stripping have a viscosity on the order of about 200 to about 400 centipoise. At ambient conditions a resin which has been stripped to a resin content of less than about 7 weight percent based on resin weight has a viscosity on the order of about 100,000 centipoise or greater. A resin having a viscosity on the order of about 100,000 centipoise presents a number of handling difficulties. In order to achieve a resin having both a low viscosity (on the order of about 3,000 centipoise) and a low water content (on the order of 3 to 7 weight percent based on resin weight), a viscosity adjusting amount of a solvent is added to the resin prior to stripping. Although it is desirable to add the solvent to the resin prior to stripping, satisfactory results have been obtained by adding the solvent after stripping.

In addition to increasing resin viscosity, stripping of water has been found to cause another significant problem. The problem centers around increasing temperatures in the foam during crosslinking. It is believed that the water acts as a heat sink during foaming to prevent explosive foaming such as is commonly seen in foaming of generally dry resole resins. In accordance with the present invention, a polyglycol is added. It is believed that the polyglycol acts as a heat sink in that it acts to prevent excessive heat build-up during the crosslinking reaction.

A typical phenolic resole-type resin contains from about 10 to about 15 weight percent water based on resin weight. In accordance with the present invention, a viscosity adjusting amount of a solvent is added to the resin prior to a vacuum stripping procedure to reduce the water content to a level of from about 3 to about 7 weight percent based on resin weight. The solvents suitable for purposes of the present invention have hereinbefore been set forth. The viscosity adjusting amount of solvent is desirably from about 10 to about 20 weight percent based on weight of resin when the solvent is added to the resin prior to stripping. The typical phenolic resole-type resin also contains from about 3 to about 10 weight percent free phenol (where free phenol is reacted to form the resole resin). Accordingly when free phenol is also used as a solvent, the total amount of free phenol present is from about 13 to about 30 weight percent based on weight of resin. Persons skilled in the art will recognize that in stripping water from the resin, an amount of solvent will also be stripped from the resin solvent mixture. Such persons will also recognize that it is generally true that when larger amounts of water must be stripped, it follows that larger amounts of solvent will also be removed. After stripping has been completed, phenolic resins of the present invention beneficially have a total amount of a phenol, such as free phenol, plus a solvent, as hereinbefore set forth, in the range of from about 10 to about 20 weight percent based on resin weight. In the event that the solvent is added to the resin after stripping, the phenolic resins of the present invention beneficially have a total amount of a phenol, such as free phenol, plus a solvent, as hereinbefore set forth, in the range of from about 10 to about 20 weight percent based on resin weight.

After the solvent addition and stripping steps have been completed, the polyglycol, the surfactant, and the blowing agent are placed in admixture with the stripped phenolic resins to form a reaction mixture. Foaming commences following addition of the acidic catalyst to the reaction mixture. The times, temperatures and other reaction conditions are well known in the art and usable in the practice of this invention. Reference is made thereto for the purposes of this invention. Merely for the purpose of illustration and not for limitation, reference is made to *Organic Chemistry of Synthetic High Polymers* by Robert W. Lenz, published in 1968 by Interscience Publishers, Inc., New York, Chapter 4, "Carbonyl Addition-Substitution Reactions," pps. 113–138 and 140–142 and to *Polymer Processes*, edited by Calvin E. Schildknecht, published in 1956 by Interscience Publishers, Inc., New York, Chapter 8, "Condensations With Formaldehyde", by T. J. Suen.

The average cell size diameter is suitably from about 0.1 to about 0.5 mm as measured in accordance with American Society for Testing Materials (hereinafter ASTM) D-2842. Fine celled foams having a cell structure wherein generally all of the cells are closed cells, can be prepared in accordance with the present invention. The blowing agent is trapped in the cells. One means of expressing the containment in the cells of the blowing agent is by use of the K-factor drift value. Unfaced cellular materials containing fluorocarbon gas have initial K-factors in the vicinity of 0.1 to 0.20 Btu/hr-°F.-ft$^2$ per inch thickness at 24° C. This low value increases over a period of months or sometimes days. The change is expressed as the K-factor drift. The K-factor is measured at a mean temperature of 24° C. The value is redetermined at various time intervals of up to 1,000 days. A material exhibiting fast K-factor drift will attain a K-factor (Btu/hr-°F.-ft$^2$ per inch thickness) of at least 0.2 within 25 days. A slow K-factor drift material may require between 200 days and over two years to attain a K-factor of 0.2 Btu/hr-°F.-ft$^2$ per inch thickness value. Any material which possesses a K-factor value under 0.2 Btu/hr-°F.-ft$^2$ per inch thickness will provide high thermal resistance. Obviously, the longer this value or a lower value is maintained, the better the efficiency of the insulation.

Foam Burn-Through Times are suitably determined by using the Burn Through Test detailed herein under Testing Methods. Phenol-aldehyde foams prepared in accordance with the present invention suitably having a Burn-Through Time of greater than 10 minutes, beneficially greater than 20 minutes and desirably greater than 30 minutes. In testing foam samples according to the Burn Through Test, it has been observed that foam samples having good Burn-Through Times (30 minutes or more) consistently have a raised and charred section where the flame touches the sample. By way of contrast, it has been observed that foam samples having poor Burn-Through Times (10 minutes or less) lack the raised and charred section. In addition, the samples having poor Burn-Through Times appear to crack and pull away from the flame source thereby allowing flame penetration.

It has been found that by varying amounts of polyglycol and total phenol in a foamable mixture, both based on weight of the phenol-aldehyde resin, one is able to affect the Burn-Through Time of the foam produced therefrom. It is to be understood that the expression "total phenol" refers to the total amount of phenol plus solvent in the foamable mixture after stripping of the phenol-aldehyde resin. A level of polyglycol of greater than about 15 percent by weight in conjunction with a total phenol level of greater than about 14 percent by weight, both based on weight of the phenol-aldehyde resin, will produce foams in accordance with the present invention having satisfactory Burn-Through Times. It has been found that at a 20 weight percent level of polyglycol, a total phenol level of 13.9 weight percent will produce mixed results. That is, a foamable mixture with such levels may yield either satisfactory Burn-Through Times or unsatisfactory Burn-Through Times (less than 10 minutes).

Autoxidation tendencies of foam samples are suitably determined by using the Autoxidation Test detailed herein under Testing Methods. Phenol-aldehyde foams prepared in accordance with the present invention generally exhibit no tendency to show an exotherm above 250° C. during the autoxidation test. Foams prepared generally in accordance with the present invention but containing less than about 10 percent by weight, based on weight of phenol-aldehyde resin, of a polyglycol selected from those hereinabove set forth tend to autoxidize or exhibit an exotherm which rises quickly above 250° C. during the autoxidation test. Foams prepared in accordance with the present invention with a polyglycol level fixed at 20 weight percent based on weight of resin but varying levels of total phenol exhibit no tendency to autoxidize during the autoxidation test. Accordingly, in order to inhibit autoxidation of phenol-aldehyde foams prepared in accordance with the present invention, it is necessary that a level of polyglycol of at least 10 percent by weight based on weight of resin must be included in a foamable reaction mixture.

The present invention is further illustrated by the following examples in which all parts and percentages are by weight unless otherwise indicated. The examples are illustrative only and are not to be taken by way of limitation.

PREPARATION OF A PHENOLIC RESIN OF THE RESOLE TYPE

370 Grams of phenol and 440 grams of an aqueous (37%) solution of formaldehyde were added to a two liter flask fitted with a condenser and a mechanical stirrer to form a first mixture. The pH of the first mixture was adjusted to about 9.0 with about 6 milliliters (ml) of an aqueous (50%) solution of sodium hydroxide to form a second mixture. The second mixture was heated to 60° C. with stirring and maintained at that temperature for a period of four hours. The second mixture was then cooled to room temperature and the pH of the second mixture lowered to about 1.7 with about 9 ml of an aqueous (40%) solution of sulfuric acid to form a third mixture. The third mixture was then heated with stirring to 60° C. and maintained at that temperature for an additional two hours. The pH of the third mixture was then raised to 5.5 with about 4 ml of an aqueous (50%) solution of sodium hydroxide after cooling the third mixture to room temperature. Upon standing, an aqueous layer separated from a resin phase. The aqueous layer was decanted off from the resin phase. The resin phase was then washed with an equal volume of water. After the wash water was decanted, the resin phase was vacuum stripped of additional water until a water content of from about 8 to about 15 percent by weight, based on weight of resin plus water, and a viscosity of about 3,000 centipoise was reached.

TESTING METHODS

Viscosities were determined using a Brookfield viscometer. Resin samples were equilibrated in a 24° C. water bath prior to viscosity measurement.

Water concentration was determined by the Carl Fischer method which is well known to those skilled in the art.

Free phenol was determined by gas chromatography using an S & M Scientific Model 5750 gas chromatograph commercially available from Hewlett-Packard Co.

K-factors were obtained using a K-Matic thermal conductivity instrument commercially available from Dynatech Corp.

Foam Friability was determined in accordance with ASTM C-421. Foam cell size was determined in accordance with ASTM D-2842.

Foams were made in a mold using various formulations as hereinafter set forth. These formulations were mixed and poured into the mold and placed in an oven set at 75° C. for a period of 45 to 60 minutes. The sample was then demolded and placed in a curing oven set at 75° C. and left in the oven at that temperature for a period of about 10 hours.

BURN THROUGH TEST

In the burn through test a foam sample having a size of 1 inch (in.)×6 in.×3 in. is placed in a holder. A propane burner flame having a temperature of 1,157° C. is introduced one inch above the sample and perpendicular thereto. The time is then measured for the flame to become visible through the bottom side of the foam opposite the side to which the flame is applied. Penetration of the flame is observed by use of a cut out in a plate on which the foam rests. The test is terminated after 30 minutes if the sample does not burn through.

AUTOXIDATION TEST

The autoxidation test occurs in an oven set at 250° C. A thermocouple is placed in a foam sample having a size of 3 in.×3 in.×3 in. The internal temperature of the foam is recorded as a function of time. Samples which autoxidized gave an exotherm that quickly rose above 250° C. The autoxidation test was terminated when the exotherm reached 400° C. to avoid generation of obnoxious fumes. Inasmuch as the foams were produced, as noted above, in an 18 in.×30 in.×2 in. mold, the test samples for the autoxidation test were prepared by gluing 3 in.×3 in.×1 in. samples together.

EXAMPLE 1

Low K-factor Foam Prepared in Accordance with the Invention

5 Pounds of phenol were added to 30 pounds of a phenolic resole resin prepared as detailed hereinabove to form a mixture. The mixture was then vacuum stripped of additional water to a viscosity of 7500 centipoise, a water content of 4.0 percent, based on mixture weight, and a free phenol content of 13.5 percent, based on mixture weight. A foamable mixture was prepared by admixing 633 grams of the stripped mixture, 14.6 grams of an alkyl siloxane surfactant commercially available under the trade designation DC-193 from The Dow Corning Corporation at Midland, MI, 126 grams of polyethylene glycol commercially available under the trade designation E-400 from The Dow Chemical Company, 90 grams of trichlorofluoromethane, a blowing agent commercially available under the trade designation Freon 11, and 47 grams of benzenesulfonic acid monohydrate (90 percent solution in water). The foamable mixture was mixed thoroughly and poured into a 30 inch×18 inch×2 inch mold and foamed as hereinabove detailed to produce a foam sample. After removal from the curing oven, the sample was tested for physical properties in accordance with the testing methods hereinbefore detailed. The sample physical properties were: (a) Friability—82 percent; (b) Foam density—2.9 pounds per cubic foot; (c) Foam cell size—0.32 millimeter; and (d) Foam K-factor—0.114 Btu/hr-°F.-ft$^2$ per inch of thickness.

EXAMPLE 2

Low K-factor Foam Prepared in Accordance With the Invention

6 Pounds of phenol were added to 40 pounds of the same phenolic resole resin used in Example 1 to form a mixture. The mixture was then stripped as in Example 1 to a viscosity of 3445 centipoise, a water content of 6.5 percent, based on mixture weight, and a free phenol content of 18.8 percent, based on mixture weight. A foamable mixture was prepared by admixing 633 grams of the stripped mixture, 14.6 grams of the same alkyl siloxane surfactant as used in Example 1, 126 grams of polypropylene glycol commercially available under the trade designation P-400 from The Dow Chemical Company, 120 grams of 1,1,2-trichloro-2,2,1-trifluoroethane, a blowing agent, commercially available under the trade designation Freon 113, and 47 grams of benzene sulfonic acid monohydrate (90 percent solution in water). The foamable mixture was then mixed thoroughly and poured into a 30 inch×18 inch×2 inch mold and foamed as in Example 1 to produce a foamed sample. The sample physical properties were: (a) Friability—68 percent; (b) Foam density—2.9 pounds per cubic foot; (c) Foam cell size—0.58 millimeter; and (d) Foam K-factor—0.116 Btu/hr-°F.-ft$^2$ per inch of thickness.

EXAMPLE 3

Low K-factor Foam Prepared in Accordance With the Invention

160 Grams of aniline were added to 800 grams of the same phenolic resole resin used in Example 1 to form a mixture. The mixture was then stripped as in Example 1 to a viscosity of 4420 centipoise. A foamable mixture was prepared by admixing 150 grams of the stripped mixture, 2.25 grams of the same alkyl siloxane surfactant as used in Example 1, 15 grams of the same polyethylene glycol as used in Example 1, 15 grams of the same blowing agent as used in Example 2, and 63 grams of benzene sulfonic acid monohydrate (90 percent solution in water). The foamable mixture was then mixed thoroughly and poured into a 9 inch×9 inch×2 inch mold and foamed as in Example 1 to produce a foam sample. After removal from the curing oven, the foam sample was tested for its K-factor. The K-factor of the sample was 0.173 Btu/hr-°F.-ft$^2$ per inch of thickness when measured initially. After a lapse of 5 weeks, the K-factor was 0.149 Btu/hr-°F.-ft$^2$ per inch of thickness.

EXAMPLE 4

Foam Prepared in Accordance With the Invention but With a Different Surfactant 8.0 Pounds of phenol were added to 54.5 pounds of the same phenolic resole resin used in Example 1 to form a mixture. The mixture was then stripped as in Example 1 to a viscosity of 5530 centipoise, a water content of 5.6 percent, based on mixture weight, and a free phenol content of 19.6 percent, based on mixture weight. A foamable mixture was prepared by admixing 225 grams of the stripped mixture, 6.8 grams of an ethoxylated castor oil commercially available under the trade designation G-1292 from Atlas Chemical, 43 grams of the same polyethylene glycol as used in Example 1, 43 grams of the same blowing agent as used in Example 2, and 15 grams of benzene sulfonic acid monohydrate (90 percent solution in water). The foamable mixture was then mixed as in Example 1 and poured into a 12 inch×12 inch×2 inch mold and foamed as in Example 1 to produce a foamed sample. The sample physical properties measured were: (a) Foam density—3 pounds per cubic foot; and (b) K-factor—0.128 Btu/hr-°F.-ft$^2$ per inch of thickness. Friability and foam cell size were not measured.

EXAMPLE 5

Foam Prepared Without Adding a Solvent Either Before or After Stripping and Without Adding a Polyglycol Following Stripping The same phenolic resole resin used in Example 1 was vacuum stripped of water to a viscosity of 100,000 centipoise and to a water content of 3.5 percent based on weight of resin plus water. With mixing, 6.75 grams of the same alkyl siloxane surfactant as used in Example 1, 45 grams of the same blowing agent as used in Example 1, and 31.5 grams of an acid catalyst mixture consisting of equal weights of 6 Normal hydrochloric acid and ethylene glycol were added to 450 grams of the stripped resin to form a mixture. The mixture was then poured into a 4 inch×12 inch×12 inch mold and foamed as in Example 1 to produce a foam sample. The sample had a K-factor of about 0.24 Btu/hr-°F.-ft$^2$ per inch of thickness.

EXAMPLE 6

Flame Penetration and Autoxidation Tests of Foam Prepared From a Foamable Mixture Having a Low Phenol Content A first mixture was formed by adding 40 grams of phenol to 800 grams of a phenolic resole resin which had previously been stripped to a viscosity of 2012 centipoise and a water content of about 12 percent based on resin weight. The mixture had a phenol content of 8.2 percent based on weight of the mixture. A foamable mixture was prepared by admixing 150 grams of the first mixture, 2.25 grams of the same alkyl siloxane surfactant as used in Example 1, 30 grams of the same polyethylene glycol as used in Example 1, 15 grams of the same blowing agent as used in Example 2, and 2 grams benzene sulfonic acid monohydrate (90 percent solution in water). The foamable mixture was then mixed as in Example 1, poured into a 12 inch by 12 inch by 2 inch mold and foamed as in Example 1 to produce a foam sample. The sample physical properties were: (a) Foam density—3.6 pounds per cubic foot; (b) K-factor—0.27 Btu/hr-°F.-ft$^2$ per inch of thickness. The sample had a Burn-Through Time of 1.5 minutes.

EXAMPLE 7

Flame Penetration Test of Foam Prepared in Accordance With the Present Invention 4.5 Pounds of phenol were added to 30 pounds of the same phenolic resole resin as used in Example 1 to form a mixture. The mixture was then stripped as in Example 1 to a viscosity of 7500 centipoise, a water content of 6.25 percent, based on mixture weight, and a phenol content of 13.9 percent, based on mixture weight. A foamable mixture was prepared by admixing 633 grams of the stripped resin, 14.5 grams of the same alkyl siloxane surfactant as used in Example 1, 126 grams of the same polyethylene glycol as used in Example 1, 120 grams of the same blowing agent as used in Example 2 and 47 grams of benzenesulfonic acid monohydrate (90 percent solution in water). The foamable mixture was then prepared as a foam sample in the same manner as set forth in Example 1. The foam sample was then tested for physical properties as hereinbefore detailed. The sample physical properties were: (a) Friability—71 percent; (b) Foam density 2.7 pounds per cubic foot; (c) Foam cell size—0.41 millimeters; and (d) Foam K-factor—0.133 Btu/hr-°F.-ft$^2$ per inch of thickness. The sample had a burn-through time of greater than 30 minutes. In addition, the sample passed the autoxidation test by exhibiting no exotherm in an oven heated to a temperature of 250° Centigrade.

EXAMPLE 8

Flame Penetration and Autoxidation Tests of Foam Prepared With 5 Percent, Based on Foamable Mixture Weight, of a Polyglycol 6 Pounds of phenol were added to 40 pounds of the same phenolic resole resin as used in Example 1 to form a mixture which was then stripped, as in Example 1, to a viscosity of 3445 centipoise, a water content of 6.5 percent, based on mixture weight, and a phenol content of 18.8 percent, based on mixture weight. A foamable mixture consisting of 633 grams of the stripped resin, 14.6 grams of the same alkyl siloxane surfactant as used in Example 1, 31.5 grams of the same polyethylene glycol as used in Example 1, 120 grams of the same blowing agent as used in Example 2, and 47 grams of benzene sulfonic acid monohydrate (90 percent solution in water) was then mixed with stirring. The foamable mixture was then prepared as a foam sample as in Example 1. The foam sample was then tested for physical properties as hereinbefore detailed with the following results: (a) Foam density—2.8 pounds per cubic foot; (b) Foam cell size—0.81 millimeter; and (c) Foam K-factor—0.267 Btu/hr-°F.-ft$^2$ per inch of thickness. The sample had a Burn-Through Time of 1 minute. In the Autoxidation test, the sample had an exotherm of 312° C. in a 250° C. oven.

EXAMPLE 9

Flame Penetration and Autoxidation Tests of Foam Prepared With 10 Percent, Based on Foamable Mixture Weight, of a Polyglycol A foam sample was prepared using the same components as in Example 8, except that the amount of polyethylene glycol was doubled, and the same procedures as in Example 8. Physical properties of the foam sample so prepared were: (a) Foam density 2.1 pounds per cubic foot; (b) Foam cell size—0.67 millimeter; and (c) Foam K-factor—0.145 Btu/hr-°F.-ft$^2$ per inch of thickness. The sample had a Burn-Through Time of 21 minutes. In the autoxidation test, the sample exhibited no exotherm in a 250° C. oven.

EXAMPLE 10

Flame Penetration and Autoxidation Tests of Foam Prepared With 20 Percent, Based on Foamable Mixture Weight, of a Polyglycol A foam sample was prepared using the same components as in Example 8, except that the amount of polyethylene glycol was quadrupled, and the same procedure as in Example 8. Physical properties of the foam sample so prepared were: (a) Friability—54 percent; (b) Foam density—2.8 pounds per cubic foot; (c) Foam cell size—0.67 millimeter; and (d) Foam K-factor—0.119 Btu/hr-°F.-ft$^2$ per inch of thickness. The sample had a Burn-Through Time of greater than 30 minutes. In the autoxidation test, the sample exhibited no exotherm in a 250° C. oven.

EXAMPLES 11-14

Burn-Through Evaluation

Foams prepared in the same manner as those prepared in Examples 7-10 above but with varying levels of phenol and polyglycol were evaluated for Burn-Through Time. The results of such evaluations are presented together with the Burn-Through Times for Examples 6-10 above in the following table.

| Example No. | % Phenol* | % Polyglycol* | Burn-Through Time (Minutes) |
|---|---|---|---|
| 6 | 8.2 | 20 | 1.5 |
| **7 | 13.9 | 20 | 30+ |
| 8 | 18.8 | 5 | 1.0 |
| **9 | 18.8 | 10 | 21 |
| **10 | 18.8 | 20 | 30+ |
| 11 | 4.2 | 20 | 1.25 |
| 12 | 13.9 | 20 | 1.5 |
| **13 | 21.4 | 20 | 30+ |
| **14 | 23.4 | 20 | 30+ |

*Based on weight of resin.
**The invention.

An examination of the data presented in the foregoing table illustrates that a total phenol content of 13.9 percent based on weight of resin represents a threshhold level at a 20 percent level of polyglycol also based on weight of resin. By total phenol content, it is to be understood that this quantity is the amount of solvent plus phenol remaining after stripping. The data further illustrates that foams having a Burn-Through Time of greater than 10 minutes are produced at a polyglycol level of about 10 percent at a total phenol content of 18.8 percent. Persons skilled in the art will recognize that optimal amounts of polyglycol and phenol may vary depending upon the phenol or the polyglycol used in making the foam but that such amounts are readily ascertainable.

An examination of the foregoing Examples 1-14 amply illustrates the advantages of the present invention. Foams having a generally closed cell structure and a K-factor of less than 0.2, preferably in the range of from about 0.116 to about 0.170 Btu/hr-°F.-ft$^2$ per inch of thickness are readily produced. In addition, by combining solvent and polyglycol, foams are produced which, in addition to having the aforementioned K-factor and cell structure, exhibit marked resistance to flame penetration and to autoxidation.

Similar results to the foregoing are produced with other solvents, polyglycols, surfactants and catalysts, all as detailed hereinabove.

What is claimed is:

1. An improved process for preparing a generally closed cell, low K-factor foam material, the foam material resulting from a process wherein a phenol-aldehyde resole resin, a blowing agent and a surfactant are admixed with an acid catalyst to form an admixture which is then poured into a forming means and cured, wherein the improvement comprises:
   (a) stripping the resole resin, in the presence of a viscosity-modifying amount of a suitable solvent, to a water content of less than about 7 weight percent, based on resin weight, and to a workable viscosity; and
   (b) adding from about 10 to about 20 weight percent, based on resin weight, of an unbranched dihydroxy ether polyglycol having a molecular weight greater than 300 to the stripped resole resin.

2. The process of claim 1 wherein the resole resin is stripped to a water content of from about 3 to about 6 percent by weight based on weight of resin.

3. The process of claim 1 wherein the amount of solvent is from 8 to about 20 weight percent based on weight of resin.

4. The process of claim 1 wherein the polyglycol is selected from the group consisting of polyethylene glycols and polypropylene glycols.

5. The process of claim 1 wherein the catalyst is benzene sulfonic acid monohydrate.

6. The process of claim 1 wherein the surfactant is an alkyl siloxane alkylene oxide block copolymer of the formula:

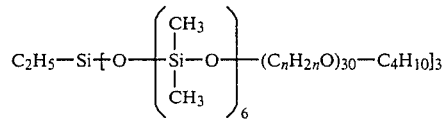

wherein $C_nH_{2n}O$ is a mixed oxyethylene/oxypropylene block of about 17 oxyethylene units and about 13 oxypropylene units; or an alkyl siloxane alkylene oxide copolymer of the formula:

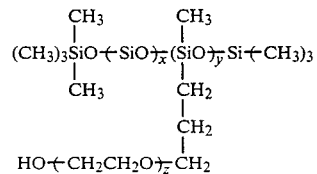

wherein x is an integer equal to 15 or 16, y is an integer equal to 2 or 3 and z is an integer equal to 10 or 11; or an ethoxylated castor oil, i.e., the condensation product of castor oil and about 23 mols of ethylene oxide per mol of said castor oil.

7. The process of claim 1 wherein the blowing agent is trichlorotrifluoroethane.

8. The process of claim 1 wherein the foam material has a K-factor which is less than 0.2 British Thermal Units per hour-°Fahrenheit-square foot per inch of thickness at 24° Centigrade.

9. The process of claim 1 wherein the foam material has a K-factor which is from about 0.116 to about 0.170 British Thermal Units per hour-°Fahrenheit-square foot per inch of thickness at 24° Centigrade.

10. The process of claim 1 wherein the foam material has an average cell size diameter of from about 0.1 to about 0.5 millimeters as measured in accordance with American Society for Testing Materials (ASTM) D-2842.

11. The process of claim 1 wherein the amount of polyglycol is greater than about 15 weight percent and a total amount of phenol plus solvent is greater than about 14 weight percent, both based on weight of resin.

* * * * *

UNITED STATES PATENT AND TRADEMARK OFFICE
CERTIFICATE OF CORRECTION

PATENT NO. : 4,530,939
DATED : July 23, 1985
INVENTOR(S) : Gregory K. Rickle

It is certified that error appears in the above-identified patent and that said Letters Patent is hereby corrected as shown below:

Column 2, line 49, "water-insoluble" should read --water-soluble--.

Column 7, line 50, "having" should read --have--.

Signed and Sealed this

Third Day of December 1985

[SEAL]

Attest:

DONALD J. QUIGG

Attesting Officer

Commissioner of Patents and Trademarks